United States Patent [19]

Sosniecki

[11] Patent Number: 5,408,920

[45] Date of Patent: Apr. 25, 1995

[54] DEVICE FOR FORMING AND SUPPORTING A THREE-DIMENSIONAL CAKE

[76] Inventor: John T. Sosniecki, 8419 Groveland Rd., Mounds View, Minn. 55112

[21] Appl. No.: 285,234

[22] Filed: Aug. 3, 1994

[51] Int. Cl.⁶ .............................................. A23P 1/00
[52] U.S. Cl. ....................................... 99/430; 99/439; 249/119; 249/120; 249/132
[58] Field of Search ................. 99/426, 430, 439, 440, 99/441, 442, DIG. 15; 249/119, 120, 125, 128, 129, 131, 132

[56] References Cited

U.S. PATENT DOCUMENTS

| | | | |
|---|---|---|---|
| 986,286 | 3/1911 | Hartmann | 99/430 |
| 1,015,892 | 1/1912 | Jefferson | 99/430 |
| 1,424,117 | 7/1922 | Popper . | |
| 1,865,097 | 6/1932 | Gilham | 426/249 |
| 1,871,755 | 8/1932 | Smith . | |
| 2,545,210 | 3/1951 | Moore | 434/82 |
| 2,803,903 | 8/1957 | Barry . | |
| 2,839,788 | 6/1958 | Dembiak | 249/129 |
| 3,064,365 | 11/1962 | Ganine | 434/82 |
| 4,452,419 | 6/1984 | Saleeba | 249/119 |
| 4,773,320 | 9/1988 | Stock et al. | 99/449 |
| 4,923,706 | 5/1990 | Binley et al. | 426/516 |
| 4,938,675 | 7/1990 | Contreras | 249/131 |

Primary Examiner—David A. Scherbel
Assistant Examiner—Reginald L. Alexander
Attorney, Agent, or Firm—Palmatier, Sjoquist & Helget

[57] ABSTRACT

A device for forming cakes and the like into three-dimensional structures, including a geometric grid of cutter blades arranged with a particular desired contour along their outer edges, wherein the cutter blades are formed into two identical half sections. The half sections may then be embedded into a pre-cooked cake to form the cake into slices confined within the half sections, and the half sections may then be affixed together and frosting applied to the exterior surface of the cake.

6 Claims, 2 Drawing Sheets

DEVICE FOR FORMING AND SUPPORTING A THREE-DIMENSIONAL CAKE

BACKGROUND OF THE INVENTION

The present invention relates generally to appliances for cooking and baking; more particularly, the invention relates to an apparatus for forming a three-dimensional, shaped cake or pastry.

Cakes having a three-dimensional form or shape are typically baked in specially molded pans in order to confine the semi-liquid materials during the baking process and to shape the baked materials into the desired form. A three-dimensional cake such as a wedding cake is typically formed by baking a number of parts of the cake in separate round or rectangular pans and then stacking the baked materials atop one another to form multiple layers and to construct the desired elevation for the overall cake. Frosting is then applied to the stacked layers in order to give the appearance of a single, frosted three-dimensional form. Wedding cakes and the like may also be frequently supported on a tiered stacking device so that the multiple layers may be separately cut and retrieved from the overall cake construction. To complete the decorative aspects of a cake, some cakes are topped with various plastic images and forms; and of course, multiple colored frostings permit the cake decorator to embellish the exterior surface of the cake with various decorative designs. Although such cakes have a three-dimensional aspect, they are always constructed to rest upon one or more base plates or pans and frosting is not applied to the underside of the cake which rests upon the supporting base plates.

While three-dimensional cakes of the prior art provide a decorative and pleasing appearance, they are frequently difficult to handle when consumed and slicing such cakes into appropriate pieces for consumption represents a challenge in itself.

Accordingly, it is desirable to construct a true three-dimensional cake wherein all surfaces of the cake may be frosted to provide an overall three-dimensional decorative appearance. Further, it is desirable to construct a three-dimensional cake wherein removal of the pieces of the cake for consumption can be simply accomplished and arranged into relatively uniform pieces for serving.

SUMMARY OF THE INVENTION

The present invention comprises a simple device for forming a three-dimensional cake which is pre-cut into appropriate size serving pieces and which facilitates the application of a desired frosting over the entire three-dimensional surface.

It is an object and advantage of the present invention to provide an appliance for constructing a three-dimensional cake which is pre-cut and which may be decoratively covered with frosting over its entire surface.

It is another object and advantage of the present invention to provide a cutting and slicing device for a cake wherein the cake may be readily trimmed into a preformed three-dimensional shape.

The invention achieves its novel advantages and objects through the construction of a grid-like cake cutter assembly which may be shaped and formed into any desired three-dimensional appearance. Depending upon the ultimate three-dimensional shape desired, the invention may be used in conjunction with conventional baking pans of either round or rectangular construction, after the cake has been fully baked in such pans and before the frosting has been applied to the cake. The grid-like construction of the invention provides a plurality of spaced-apart cutter blades, some of which are typically orthogonally positioned relative to other parallel-spaced blades, secured within an outer frame which may be of wire or similar construction.

The foregoing objects and advantages of the invention will become apparent from the following specification and claims and with reference to the appended drawings.

DESCRIPTION OF THE PREFERRED EMBODIMENT

Figure 1:
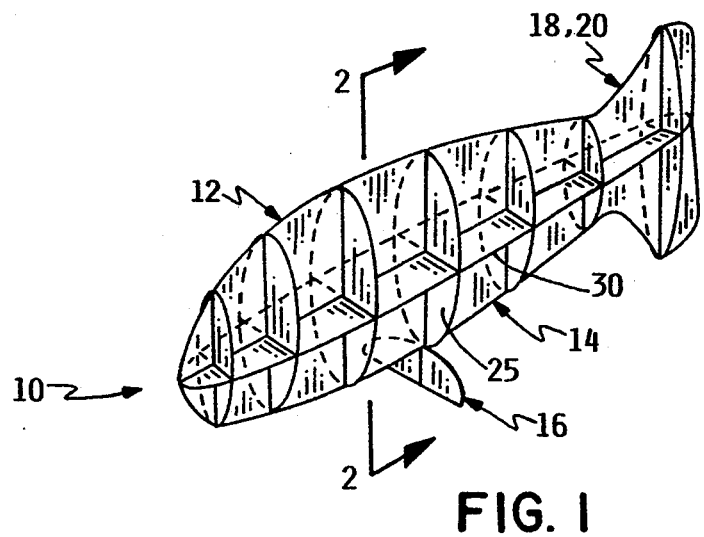
FIG. 1 is a perspective view of one preferred embodiment of the present invention shown in an arbitrarily selected fish configuration.
Figure 2:
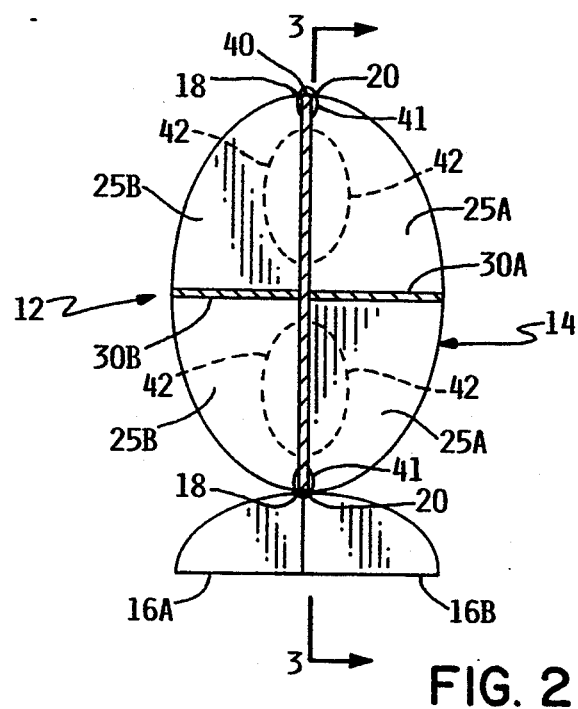
FIG. 2 shows a sectional view of the invention taken along the lines 2—2 of FIG. 1.

Referring first to FIG. 1, the invention is shown in perspective view, wherein the three-dimensional shape of a fish has been selected for illustrative purposes. The three-dimensional construction 10 is preferably formed from two separable halves 12, 14. The respective half sections 12, 14 may be secured together during the forming process by means of clips, ties, or any other conventional attachment device. The invention is typically supported in an elevated position on a stand 16, which may itself be formed into separable sections 16a, 16b, as shown in FIG. 2. The particular form or shape of stand 16 is a matter of personal choice, provided that the stand has sufficient structural strength to support the apparatus as shown. In some cases it may be necessary to strengthen the undersurface of sections 12, 14 in order to provide further structural support for engaging the support stand 16. Of course, it is also contemplated that some embodiments may require more than one stand, or a stand made in some other form, to support the particular three-dimensional cake structure.

Each of the respective sections 12, 14 has an outer peripheral wire form 18, 20 which is shaped to conform to the desired three-dimensional cake form. A plurality of cutter blades 25 are respectively affixed along their outer edges to the wires 18 or 20. A plurality of orthogonal cutter blades 30 are respectively affixed between adjacent cutter blades 25, and the outermost cutter blades 30 are also affixed to the wire periphery forms 18, 20. The particular form of affixation of the respective blades 25, 30 to each other, and to the wires 18, 20, depends upon the nature of the material selected for this purpose. For example, if the wires 18, 20 are formed of metallic wire and the blades 25, 30 are formed of metallic blades, the affixation may be accomplished by welding or soldering. Alternatively, the "wires" 18, 20 and the "blades" 25, 30 may be formed of plastic together in a single molding process, wherein an entire section 12, 14 is produced from a mold. Of course, the precise curvature and shape of the periphery of the blades 25 and 30 is dependent upon the desired form of the overall cake; and the respective different blades may have different sizes and shapes consistent with the desired form.

FIG. 2 shows a sectional view taken along the lines 2—2 of FIG. 1, wherein the half sections 12, 14 are readily apparent. A particular blade 25a is illustrated for each of the sections 12, 14, wherein the end points of the blade 25a are affixed to the wire form 20. Similarly, the end points of the blade 25b are affixed at its respective end points to wire form 18. An orthogonal blade 30a is affixed along one of its edges to blade 25a and along its other edge to the next adjacent blade which forms a part of half section 14. Similarly, the orthogonal blade 30b is affixed along one of its edges to the blade 25b and along its other edge to the next adjacent blade which forms a part of half section 12.

The blades 25 and 30 are shown in FIGS. 1 and 2 as extending to the center of the device, in flush engagement along the respective blade center lines. In some constructions, it may be necessary to provide a section of blade which is cut back along its inner edge, in order to not cut completely through a cake during the assembly process. An example of a cut-back region for blades 25a and 25b is shown in FIG. 2 in dotted outline form 42. This embodiment leaves a portion of the cake uncut and, therefore, reduces the tendency for the cake pieces to separate in an unintended manner while the cake is being supported in the apparatus.

A plurality of clips 41 may be used to hold the half sections 12, 14 together. Clips 41 may be spring clips of plastic or metal, or any other convenient attachment devices.

The supporting stand is shown in FIG. 2 as being comprised of two half sections 16a, 16b, each of which may be respectively affixed or attachable to a corresponding half section 12, 14. If desired, a separator plate 40 may be affixed between half sections 12, 14 to provide isolation of the respective halves to facilitate ease of removal of the cake as will be hereinafter described.

Figure 3:
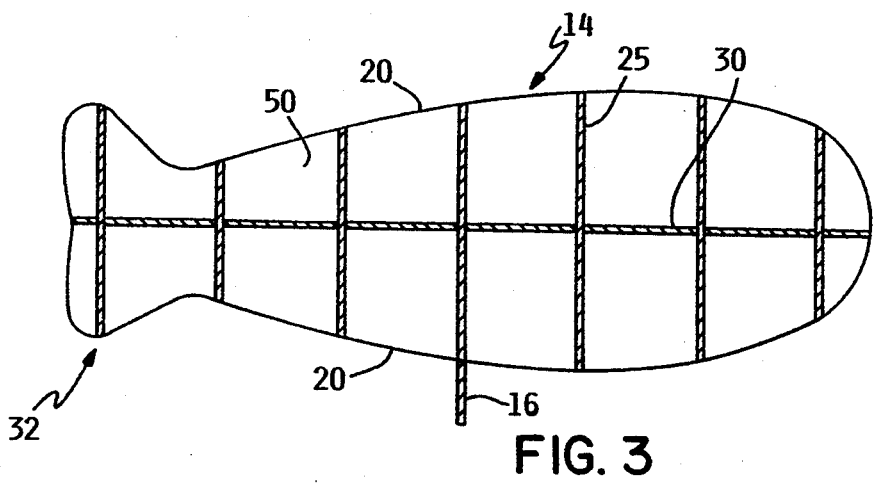
FIG. 3 shows a sectional view of the invention taken along the lines 3—3 of FIG. 2.

FIG. 3 shows an elevation view of half section 14 which is taken along the lines 3—3 of FIG. 2. The plurality of blades 25 are readily illustrated, each of which are affixed at their end points to the wire form 20. The tail section 32 may also be formed with respective orthogonal blades 25, 30 to provide a plurality of individual compartments 50, each of which are defined as the particular volumes formed by the adjacent blades 25, 30 and the outer form 20.

Figure 4:
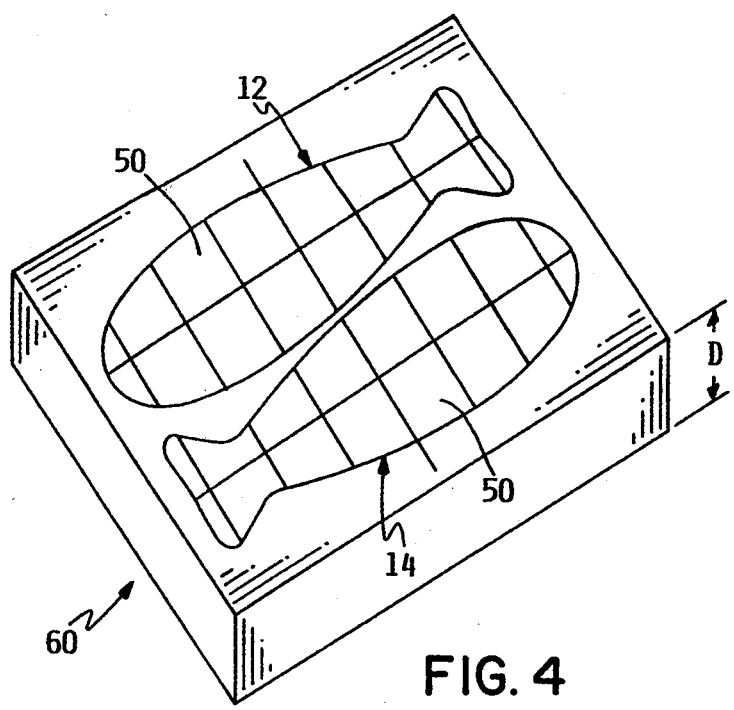
FIG. 4 shows the embodiment of FIG. 1 applied to a prebaked cake in a pan.

FIG. 4 shows a perspective view of a rectangular cake pan 60 having a depth dimension D, which is approximately equal to the thickness of each of the half sections 12, 14. The respective sizes of the half sections 12, 14 and of the cake pans 60 are selected so as to enable the half sections 12, 14 to conveniently fit within the pan as shown. In operation, pan 60 would first be used to produce a fully baked cake; and thereafter, each of the half sections 12, 14 are impressed into the cake as shown in FIG. 4. Each of the sections will, via its respective cutter blades, penetrate the cake to form a plurality of cake sections within the respective volumes 50, each cake section being separately confined within its volume 50 to provide an individual serving piece. The half sections 12, 14 and the respective cake portions which they enclose are then removed from the cake pan. This part of the process may be accomplished by simply turning the cake pan upside down with the respective half sections 12, 14 embedded therein and first removing the entire cake from the pan. Thereafter, the respective half sections 12, 14, with the cake sections they encompass, are separated from each other and the cake is trimmed to conform to the three-dimensional form of the respective half sections 12, 14. The trimming operation can be easily accomplished with a knife or sharp tool, wherein the final result is a half section 12, 14 having individual cake pieces embedded in the respective volumes 50. The half sections may then be attached together, and preferably with an intermediate plate such as 40, shown in FIG. 2; and the entire three-dimensional structure may then be mounted on a stand 16. After this is accomplished, frosting may be applied over the entire external surface of the cake and half sections 12, 14 to provide a three-dimensional frosted appearance. Of course, various frosting colors and designs may be added to suit the individual preference, and the finished cake is supportable on the stand 16 as a three-dimensional cake with frosting on all surfaces.

The individual portions of cake which are confined in the respective volumes 50 may be readily removed by a knife or spatula-like tool, wherein the removal operation is guided by the respective compartment walls formed by the blades 25, 30. After the entire cake has been removed in the sections as described herein, the half sections 12, 14 may be washed, cleaned and reused on another occasion.

Figure 5:
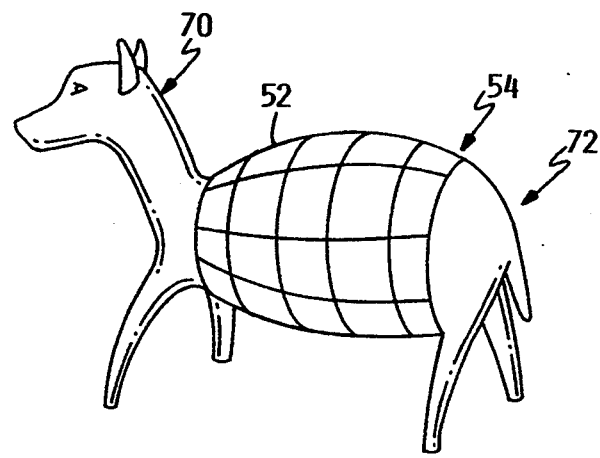
FIG. 5 shows another embodiment of the invention in perspective view.

FIG. 5 shows an alternative embodiment of the apparatus wherein half sections 52, 54 may be combined in the manner hereinbefore described and may form a part of a larger overall design configuration. In the example of FIG. 5, the front section 70 of an animal and the rear section 72 of an animal may be used as a decorative addition to the middle section formed by the cake confined within half sections 52, 54; and the front and rear sections 70, 72 may also provide the elevated stand for holding the cake.

Figure 6:
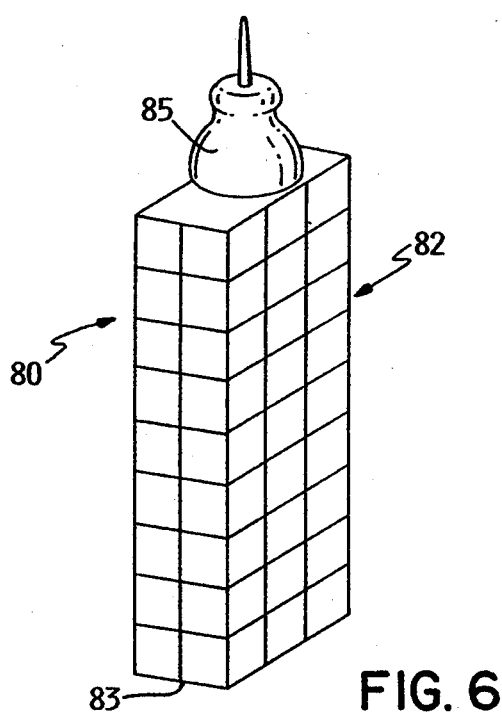
FIG. 6 shows yet another embodiment of the invention in perspective view.

FIG. 6 shows yet another embodiment of the invention wherein a three-dimensional cake may be formed into the shape of a building or other structure. In this case, half sections 80, 82 are joined together along an intermediate edge 83 to form a design which may be associated with the building construction. Another cake section 85 may be affixed atop the lower section to provide an ornamental topping for the overall building appearance.

In all cases, the operation and use of the invention proceeds as has been described herein. First, a fully baked cake is formed in an appropriately-sized pan; second, the respective half sections of the cutter blades are embedded into the cake in the pan to cut the cake into slices and confine the slices within the volumes formed between the respective cutter blades; third, the cake in the half sections are removed from the pan and trimmed to form the outer cake surface in conformity with the three-dimensional half sections; fourth, the half sections are affixed together; and fifth, the exterior three-dimensional surface of the cake is frosted with an appropriate decorative frosting. Individual cake slices may be thereafter removed by a knife or spatula-like device which may be slidably entered into the respective compartments formed by the cutter blades to slide the individual slices from the structure.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for forming and supporting a three-dimensional cake, comprising:
   a) a peripheral wire member formed into a planar physical shape;
   b) a first plurality of spaced-apart cutter blades having respective ends affixed to said peripheral wire member;
   c) at least one second cutter blade arranged orthogonally to said first plurality and affixed between adjacent cutter blades of said first plurality; and
   d) all of said cutter blades having respective aligned inner and outer edges to form a predetermined surface contour.

2. The apparatus of claim 1, further comprising a support member affixed to said peripheral wire member, said support member comprising a stand for resting on a horizontal surface and for holding said peripheral wire member with its planar physical shape in a generally vertical position.

3. An apparatus for forming and supporting a three-dimensional cake, comprising:
   a) a first peripheral wire member formed into a first planar physical shape, and a first plurality of spaced-apart cutter blades having respective ends affixed to said first peripheral wire member;
   b) a second peripheral wire member formed into a second planar physical shape matching said first planar physical shape, and a second plurality of spaced-apart cutter blades having respective ends affixed to said second peripheral wire member;
   c) means for affixing said first peripheral wire member adjacent said second peripheral wire member; and
   d) a support stand affixable to said first and second peripheral wire members.

4. The apparatus of claim 3, wherein said first plurality of spaced-apart cutter blades and said second plurality of spaced-apart cutter blades all have respective flat edges in planar alignment with said respective first and second peripheral wire members.

5. The apparatus of claim 4, further comprising a separator plate interposed between said first and second peripheral wire members.

6. The apparatus of claim 5, wherein said first and second plurality of cutter blades have respective outer edges to form a surface contour of predetermined shape.

* * * * *